Sept. 8, 1959   O. J. BORNGESSER ET AL   2,903,205
ELECTRIC 'G' LIMITER FOR AIRCRAFT
Filed Nov. 15, 1956   3 Sheets-Sheet 1

INVENTORS
OTTO J. BORNGESSER
ALFRED J. MONROE
BY
ATTORNEYS

Sept. 8, 1959     O. J. BORNGESSER ET AL     2,903,205
ELECTRIC 'G' LIMITER FOR AIRCRAFT Filed Nov. 15, 1956     3 Sheets-Sheet 3

INVENTORS
OTTO J. BORNGESSER
ALFRED J. MONROE
BY
ATTORNEYS

United States Patent Office 2,903,205
Patented Sept. 8, 1959

2,903,205

ELECTRIC "G" LIMITER FOR AIRCRAFT

Otto J. Borngesser, Hermosa Beach, and Alfred J. Monroe, Los Angeles, Calif., assignors, by mesne assignments, to the United States of America as represented by the Secretary of the Navy Application November 15, 1956, Serial No. 622,508

5 Claims. (Cl. 244—83)

This invention relates to aircraft control systems for limiting the pilot ability to overstress the aircraft by introducing an opposing stick force or torque varying as a function of the vertical acceleration, and more particularly to such a system in which a controlled rate of torque is applied to the stick controls through an electrical clutch being driven at a predetermined controlled speed.

The increased performance characteristics of present day military aircraft has resulted in placing the imminent destruction of the aircraft due to aerodynamic overloads within reach of the pilot as an everyday danger. This danger is not always immediately appreciated by the pilot as his controls are not limited by stick forces resulting from high aerodynamic hinge moments or high load factors.

As would be expected numerous g-limiter systems have been proposed to correct this condition by introducing an opposing control stick force to warn the pilot by feel of the imminent danger, and to make it difficult for him to carry out the dangerous maneuver. One of these stick force producing systems is shown in U.S. Patent No. 2,630,284 which utilizes a torque motor for applying the limiting force to the control stick linkage of the aircraft, this arrangement being generally representative of the state of the art. One important disadvantage of employing a torque motor in a force limiting system in aircraft requiring high stick forces is that it produces an inherently unstable system because the limiting force is applied to the controls instantaneously and at high accelerations causing an equally sudden change of aircraft attitude. The failure to restrict the limiting forces applied to the controls results in a system capable of tearing the aircraft apart, which may occur for example, if the pilot releases his control stick during a high g maneuver. In addition, since the limiting force is applied instantaneously, a high gust of wind can cause the aircraft to be subjected to vertical oscillations. A further disadvantage resides in the relatively high inertia and friction inherent in a torque motor which introduce a false force on the control stick of the aircraft, this feature being particularly detrimental in systems where the limiter system is continuously in operation.

This invention provides a stable g-limiter system by controlling the response of the aircraft to the limiting force. The corrective forces applied to the aircraft's control linkage are limited by employing an electrically controlled clutch, preferably a magnetic particle type clutch, driven at a predetermined and controlled speed, the speed being regulated to a safe value depending on the design characteristics of the particular aircraft. Therefore, regardless of the amount of torque, the maximum output velocity of the clutch cannot exceed the maximum input velocity, and this velocity limitation of clutch ensures the desired stability of the force-feel system and the aircraft which it controls. The g-limiter system does not have absolute control over the airplane so that in an emergency requiring drastic action the pilot can override the g-limiter.

A principal object of this invention is to provide a safe and stable g-limiter system for aircraft.

Another object is to provide an aircraft g-limiter system employing an electrically controlled clutch for applying the limiting force to the aircraft controls.

Still another object is to provide a force limiter that is in operation only above a predetermined load condition.

A further object is to provide an improved magnetic particle clutch which is smaller in size and weight and produces an increased torque.

Other objects and many of the attendant advantages of this invention will be readily appreciated as the same becomes better understood by reference to the following detailed description when considered in connection with the accompanying drawings wherein.

Figure 1:
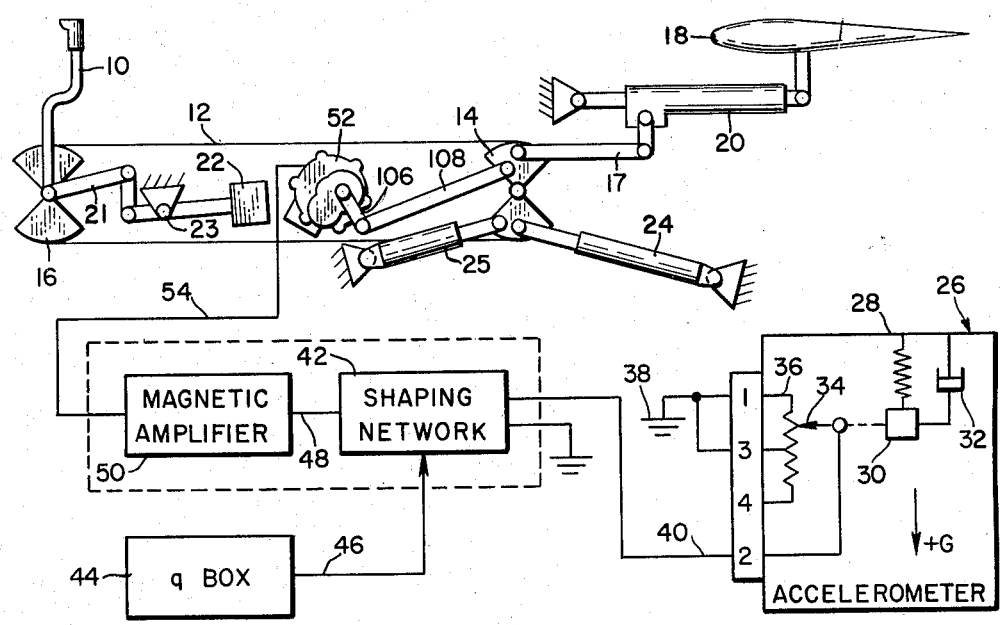
Fig. 1 is a diagrammatic general arrangement view of the novel force limiter system connected to the stick controls of a conventional aircraft.
Figure 2:
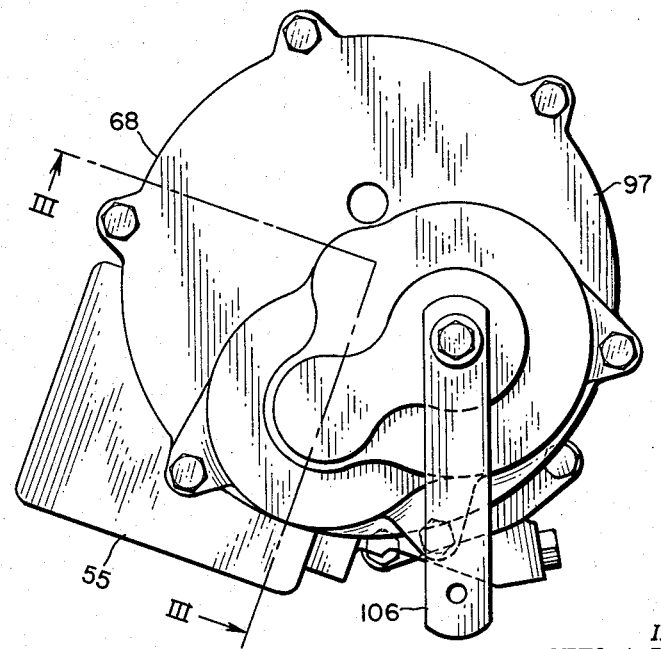
Fig. 2 is an end view of the novel magnetic clutch.

Referring now to the drawings wherein like reference numerals designate like or corresponding parts throughout the several views, there is shown in Fig. 1 the conventional surface controls of an aircraft which includes a pilot's stick 10 connected by a cable 12 to a pair of aft and forward sectors 14 and 16, respectively, the aft sector being articulated through a link 17 to an aircraft stabilizer surface 18 through a hydraulic actuator 20. Stick 10 is also connected by linkage 21 to a bobweight 22 horizontally pivoted at fixed point 23 for providing a mechanical standby force limiter in the pilot's controls in the event of failure of the main force limiter presently to be described. A feel bungee 24 is attached to aft sector 14 to provide an artifical tension or load on the control linkage. The foregoing described stick control system is well known in the art and forms no part of this invention. A second bungee 25 is also connected to aft sector 14 to provide a load on the system for a reason later to be described.

The force limiter of this invention generates a relatively high opposing or inhibiting force in the stick control system when the pilot's input would otherwise increase the structural loads on the aircraft beyond the yield point. The force limiter system generally combines elements which are perceptive of an earth frame of reference and an aerodynamic frame of reference. A second group of elements predicts the future conditions of the aircraft on the basis of the information from the perceptive elements. The prediction of the second group of elements appears as a controlling signal in a actuator element which converts the electrical signal into a physical force to control the aircraft directly and warn the pilot in sufficient time to prevent overstressing of the aircraft. The result, in general is that the predicted conditions are prohibited from occurring.

The basic perceptive element in the system is an accelerometer 26 which is designed to pickup negative or positive g's in a critical part of the aircraft most likely to suffer ultimate loads, such as the tail section. Accelerometer 26 is enclosed in a frame 28 in which is mounted a spring restrained weight 30 connected to a damping device 32. Weight 30 is also connected to a slidable contact 34 of a potentiometer 36 for obtaining a voltage in proportion to the g-load. As the aircraft will not be overstressed by g's up to a certain limit, and, as it is desirable that the limiter does not operate at lower g values than the limit, the accelerometer includes a means to prevent a voltage output until a critical g is encountered. This means is provided by making potentiometer 36 of a tapped construction having terminals #1, #2, #3, and #4, the resistor being calibrated so that terminal #1 represents zero g, terminal #3 represents a limit value, i.e., 5.2 g, and terminal #4 represents an upper value, i.e., 12 g. If terminals #1 and #3 are grounded at 38 there will be no voltage output from the accelerometer until 5.2 g's is reached. Beyond this point the voltage between terminal #2 and ground will increase linearly with g. Obviously, the g value selected for tapped terminal #3 will depend on the design characteristics of the particular aircraft on which the force limiter system is used.

The signal voltage output of the accelerometer in line 40 is a measure of acceleration and is fed into a conventional shaping network 42 which adds to the signal a component rate of change of g's thus acting as a predictor of future g conditions. It may be desirable to use a q box 44 electrically connected by line 46 to shaping network 42 for altering the shaping network to account for the differential air pressure experienced by the forward motion of the aircraft. This will provide the system with a direct aerodynamic sense of the aircraft's environment. The advantage of this feature is that the rate of change of g's will not be constant for all q's, and, therefore, the q value should be included to predict a true rate of change of g's if the force limiter system is to function correctly over the design speed range of the aircraft. Various other factors can be fed into the shaping network if desired such as Mach number, the gyro pitch or aircraft's attitude, the angle of attack of the wing, or the position angle of the horizontal stabilizer.

The output signal of the shaping network is fed in line 48 to a conventional amplifier 50, which produces a rectified, unfiltered output voltage whose magnitude is a function of the signal input. A magnetic type amplifier is preferable because it exhibits properties particularly suitable for use in a g-limiter; namely, reliability, high-power gain, and a linearity characteristic which can be varied as a function of some regulating parameter.

Amplifier 50 utilizes the shaped control signal from shaping network 42 to determine the degree of energization of a servo actuator 52 via line 54, actuator 52 converting the electrical signal into a physical force to be applied to the pilot's control through aft sector 14. Servo actuator 52 is a motor driven electrical clutch, preferably a magnetic fluid type presently to be described. The use of such a clutch in the force-limiter combination is of particular importance in the present invention for it ensures a safe and stable g-limiter system for controlling aircraft flight under all operating conditions.

Figure 3:
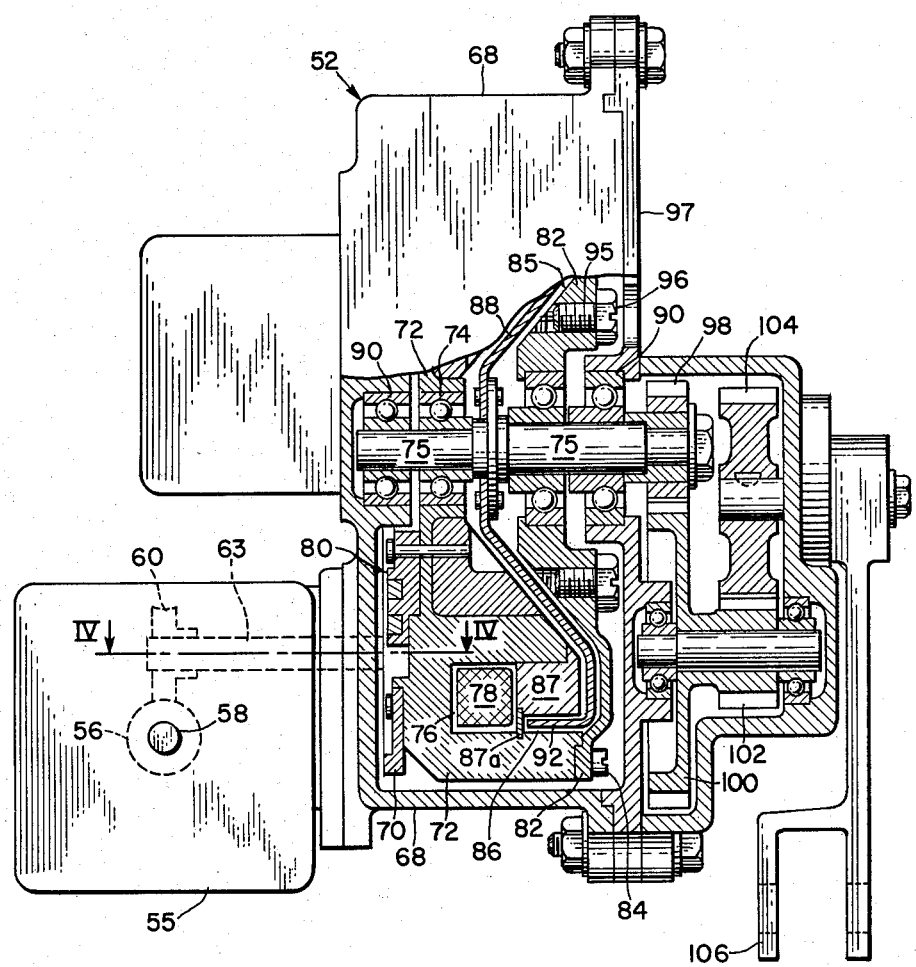
Fig. 3 is a partial cross-sectional view of the clutch taken along line III—III of Fig. 2.
Figure 4:
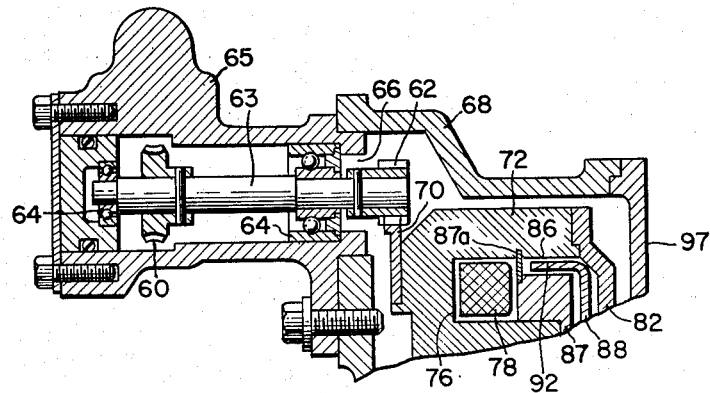
Fig. 4 is a sectional view of the worm drive between motor and clutch taken along line IV—IV of Fig. 3.
Figure 5:
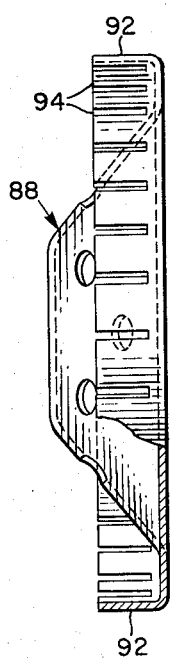
Fig. 5 is a partial sectional view of the clutch disc.

The details of magnetic clutch type servo actuator 52 are shown in Figs. 2–5 and includes a three phase, 400 cycle A.C. motor 55 (⅛ to ¹⁄₁₆ H.P.) which drives the clutch through a gear train at a constant speed, the speed being selected according to the particular design characteristics of the aircraft such that the response of control stick 10 will be always at a safe speed. As shown in Figs. 3 and 4, the gear train consists of a worm 56 mounted on a motor shaft 58, a worm wheel 60 and a pinion gear 62 both of the latter mounted on opposite ends of a shaft 63 suitably supported on bearings 64. The gear train is enclosed in a housing 65 suitably bolted to the clutch housing 68.

Gear 62 extends through an opening 66 in the clutch housing for driving connection with a ring gear 70. Ring gear 70 is bolted around the periphery of the rear face of a circular pole piece 72 rotatably mounted in housing 68 on bearings 74 supported on a shaft 75. Pole piece 72 driven at a predetermined selected speed by motor 55 through the aforementioned gear train. Referring in particular to Fig. 4, pole piece 72 has an annular recess 76 formed in the front face thereof for housing an excitation coil 78 being electrically connected by line 54 to amplifier 50 (Fig. 1) through a slip-ring and brush assembly 80 (Fig. 3). The amount of clutch current available to energize coil 78 will obviously depend on the signal strength. A pole piece cover plate 82 is attached by bolts 84 to the pole piece and is rotatably supported as an integral unit with pole piece 72 on suitable bearings. Cover 82 is spaced from the pole piece to define an annular narrow chamber 85 having a generally hat-shaped configuration. Pole piece recess 76 is partially closed by a press-fitted iron ring 87 and a brass shield ring 87a creating a horizontal peripheral chamber portion 86 in communication with chamber 85 and forming a continuation thereof. Ring 87 is employed as a manufacturing expedient to ensure a good electrical path for the lines of flux created by coil 78.

A clutch disc 88, conforming generally to the hat-shaped configuration of chamber 85, is rotatably disposed therein being secured to shaft 75 supported between end bearing 90. Disc 88 (Figs. 3 and 5) is formed with a peripheral flange 92 which flange projects into the peripheral chamber portion 86 and in the path of the lines of flux from coil 78. By constructing disc flange 92 to be parallel to the axis of rotation, the entire surface area of the disc subject to the lines of flux is at a maximum radius capable of producing a maximum torque. This construction permits the use of a smaller disc and reduces the over-all size of the clutch. Flange 92 is intermittently slotted at 94 around the periphery to enable more clutch power, i.e., iron powder to be present between the disc and the pole piece thereby increasing the torque output. Chamber 85 is filled with iron powder through an opening 95 in cover plate 82 being closed by a plug 96. Plug 96 is accessible through a suitable opening in a clutch housing cover 97. In operation, rotation of the pole piece assembly by motor 55 causes the iron powder to be centrifugally displaced into chamber portions 86 of chamber 85 where the powder is under the influence of the lines of force from coil 78 and forms strings or chains. The magnetized powder creates a drag between the pole piece assembly and disc 88 so that rotation of disc 88 will be opposed by the shearing of the magnetized chains of powdered iron. This resistance to rotation will be proportional to the amount of current in coil 78.

The output of the clutch through shaft 75 is transmitted through a gear train including gears 98, 100, 102, and 104 to an output arm 106 which is connected by a link 108 to aft sector 14 (Fig. 1) or any other suitable portion of the control system.

The amount of inhibiting force applied to the pilot's stick control linkage through the clutch is a function of the clutch current. In one specific embodiment of the invention the inhibiting force may be varied from zero to 180 pounds by a variation in the clutch current of zero to 500 milliamperes, respectively.

It is believed that a small constant torque output will exist inherently in the magnetic clutch regardless of the fact that the current in the clutch is zero. This residual torque is due to the small amount of remaining magnetism in the clutch and the viscous shear of the demagnetized clutch powder. Its effect is biased out of the control system by employing a preloaded, low rate bungee 25 connected to aft sector 14 in Fig. 1.

It is thus apparent that the pilot is connected through the stick control system to arm 106 of the magnetic clutch and, therefore any torque produced in the control system by the magnetic clutch will be sensed by the pilot as a stick force feel. This torque will be produced by any amount of g's above the critical value, the critical g's being converted into electrical control signals which are shaped in the shaping network and used to produce proportional torque outputs from the magnetic clutch actuator as described above. For any value of g below the critical value, the g-limiter would be quiescent. As signals proportional to stick position and the measured g's and other preceptor information is fed into the limiter, the analogue will proceed to compute the future g's that the aircraft will experience. Because this prediction leads the actual aircraft performance, the analogue will have predicted that at some future time ($t_2$) the aircraft will suffer limit g's. At this instant ($t_2$) the g-limiter will begin to put a force into the pilot's feel system and cause him to modify his stick movements. This change in stick rate is returned to the analogue which computes whether the limit g will occur at another future time. At all g's over the limit g, the aircraft will have longitudinal damping through the action of the limiter and as a result it will be possible for the pilot to fly the aircraft closer to the ultimate g level without overshooting the mark.

However, the limiter system is designed so that in cases where it is absolutely necessary to maneuver the aircraft in a manner which will overstress the critical parts, the pilot may overcome the feel force provided by the g-limiter and continue movement of the control stick against the inhibiting force. The magnetic clutch actuator permits this action because the limiting torque output of the clutch is always less than the opposing effort which the pilot may develop. Therefore, in extenuating environmental circumstances calling for excessive g's on the aircraft, the pilot may at his discretion deliberately overstress the aircraft accordingly. The g-limiter provides a safety factor in normal operations while in addition allows the pilot to override the limiter in extreme situations.

Obviously many modifications and variations of the present invention are possible in the light of the above teachings. It is therefore to be understood that within the scope of the appended claims the invention may be practiced otherwise than as specifically described.

We claim:

1. In an aircraft having control linkage, a g-limiter including an accelerometer for producing a voltage signal proportional to aircraft acceleration, a shaping network for adding to the signal a component of rate of change of acceleration, means for amplifying the modified signal, a clutch controlled by the signal to produce a torque proportional to the signal, a motor for driving said clutch at a speed which provides a controlled rate of application of the generated torque output, means for connecting the clutch to the control linkage whereby a limiting force will be applied to the control linkage in proportion to the signal.

2. Apparatus according to claim 1 wherein the clutch is a magnetic powder clutch.

3. Apparatus of claim 1 wherein the accelerometer voltage signal is proportional to the aircraft acceleration when said acceleration exceeds a predetermined value.

4. Apparatus of claim 3 wherein the accelerometer includes means to limit the signal output until the acceleration exceeds the predetermined value.

5. In an aircraft having control linkage, a g-limiter including an accelerometer for producing a voltage signal proportional to aircraft acceleration, a shaping network for adding to the signal a component of rate of change of acceleration, means for amplifying the modified signal, a magnetic powder clutch operable by the signal, said clutch including a rotatable pole piece housing a coil, a rotatable disc provided with a peripheral flange extending parallel to the axis of rotation, said disc flange being disposed within the pole piece and crossing the magnetic lines of force, means for driving said pole piece at a speed which provides a controlled rate of application of the torque output to the control linkage whereby a limiting force will be applied to the control linkage in proportion to the signal.

References Cited in the file of this patent

UNITED STATES PATENTS

| | | |
|---|---|---|
| 2,630,284 | Feeney | Mar. 3, 1953 |
| 2,709,507 | Trickey | May 31, 1955 |
| 2,767,942 | Lucien | Oct. 23, 1956 |
| 2,772,762 | Gamundi et al. | Dec. 4, 1956 |